United States Patent
Lilly

[15] 3,706,462
[45] Dec. 19, 1972

[54] INFLATABLE SAFETY DEVICE

[72] Inventor: Wallace B. Lilly, 202 College Ave., Beckley, W. Va.

[22] Filed: May 28, 1970

[21] Appl. No.: 41,282

[52] U.S. Cl..................................280/150 AB, 9/316
[51] Int. Cl..............................................B60r 21/08
[58] Field of Search.........................280/150; 9/316

[56] References Cited

UNITED STATES PATENTS

| | | | |
|---|---|---|---|
| 3,430,979 | 3/1969 | Terry et al. | 280/150 |
| 2,993,217 | 7/1961 | Switlik | 9/316 |
| 3,070,818 | 1/1963 | Fairchild | 9/316 |
| 3,552,770 | 1/1971 | Berryman | 280/150 |
| 2,859,048 | 11/1958 | Munn | 280/150 |
| 3,243,822 | 4/1966 | Lipkin | 280/150 X |
| 2,703,891 | 3/1955 | Mayer | 9/319 |
| 3,514,124 | 5/1970 | Richardson | 280/150 AB |

FOREIGN PATENTS OR APPLICATIONS

| | | | |
|---|---|---|---|
| 609,624 | 9/1960 | Italy | 280/150 AB |

*Primary Examiner*—Kenneth H. Betts
*Attorney*—Dodge & Ostmann

[57] ABSTRACT

An inflatable bag for protecting the occupant of a car from injury as a result of a collision. The bag is securely connected to the occupant's seat belt. The bag normally is deflated and is releasably confined so that upon inflation the bag is quickly released and, by reason of its being mounted on the seat belt, assumes a position in front of the occupant using the seat belt.

2 Claims, 4 Drawing Figures

PATENTED DEC 19 1972 3,706,462

INVENTOR
WALLACE B. LILLY

BY Dodge & Ostmann
ATTORNEYS

INFLATABLE SAFETY DEVICE

BACKGROUND AND SUMMARY OF THE INVENTION

It is known to use inflatable bags as a means to protect vehicle occupants from injury. Such bags are stored in receptacles in the instrument panel, the hub of the steering wheel, in overhead compartments or in door compartments. Thus, they are stored in fixed locations chosen for their relationship to the occupant's likely position.

According to applicant's invention, the deflated bag is releasably confined and the bag's base is connected to the center of the seat belt worn by the occupant. Thus, when the bag is inflated, it will be positioned directly in front of the occupant and between him and any part of the car against which he might be thrown.

BRIEF DESCRIPTION OF THE DRAWING

The preferred embodiment of the invention is shown in the accompanying drawing in which.

DESCRIPTION OF PREFERRED EMBODIMENTS

Figure 1:
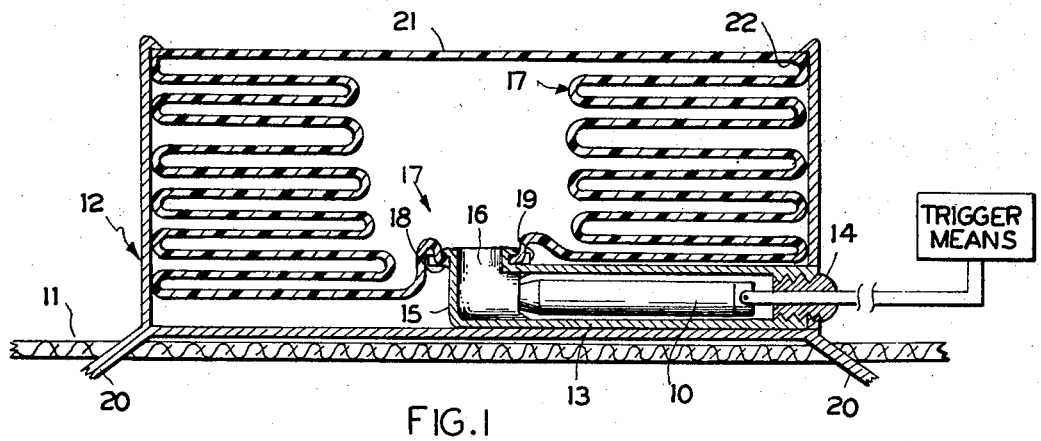
FIG. 1 is a longitudinal section of the stored bag.
Figure 2:
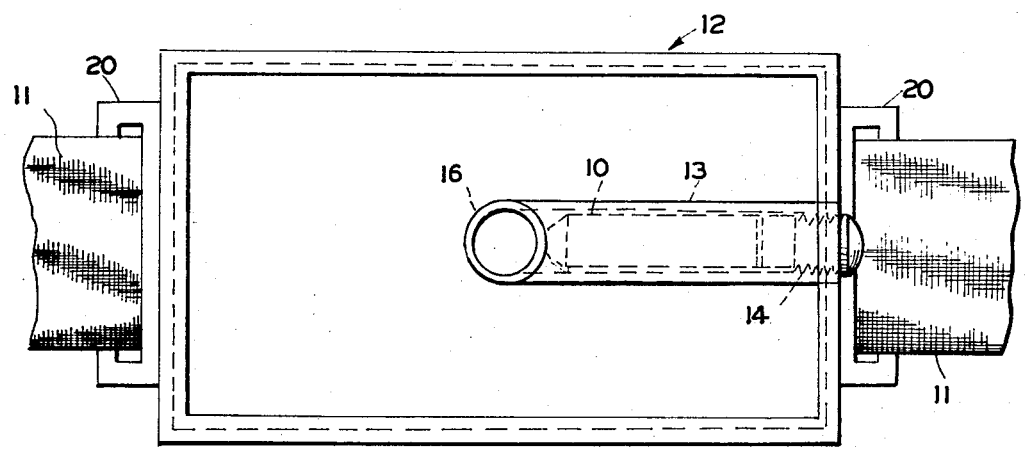
FIG. 2 is a top plan view of the device shown in FIG. 1 in which the cover and the bag have been removed.

Refer first to FIG. 1. The occupant's seat belt is shown at 11. An open-topped, boxlike container 12 is mounted so as to be adjustable longitudinally of the belt. This adjustable mounting comprises loops 20 connected to opposite ends of the container 12, but may take any desired form. Adjacent the bottom of the container is a cylinder chamber 13 adapted to receive a $CO_2$ cartridge and detonator 10 which can be fired by an electrical signal. The outer end of the chamber 13 is closed by a gas-tight end piece 14.

The chamber 13 is connected by a conduit 15 to a flanged fitting 16. A bag 17 is mounted in the container 12 and has its mouth 18 securely fastened to the fitting 16 in any suitable manner. A clamping ring 19 is shown. The bag 17 includes a stiffened portion 21 which serves as a closure panel for container 12. This stiffened portion could, of course, be replaced by a panel of metal or plastic which might be separate from the bag or bonded thereto. The separate panel is the least desirable form, since is would be released in the car's interior when bag 17 is inflated and might itself injure an occupant. The separate panel could, however, be connected by a tether or a hinge to the container 12.

The panel 21 is held in place impositively. It may be made of a resilient material which can bow outward when the bag is inflated. Such bowing would draw the peripheral edges of the plate inward to release them from the undercut 22. The undercuts 22 could be formed on flexible fingers which would be pushed back to release a rigid plate when the bag 17 is being inflated. The electrically fired detonator can be fired in any convenient way by a trigger means. The trigger means may comprise a simple impact actuated switch which is closed to fire the detonator and release liquid $CO_2$ from the cartridge 10, thereby causing inflation of the bag. The trigger means and the combined $CO_2$ capsule and detonator are not my invention and may take any conventional form. A manually actuated gas valve could be used, but must be designed to guard against being accidentally opened.

Figures 3, 4:
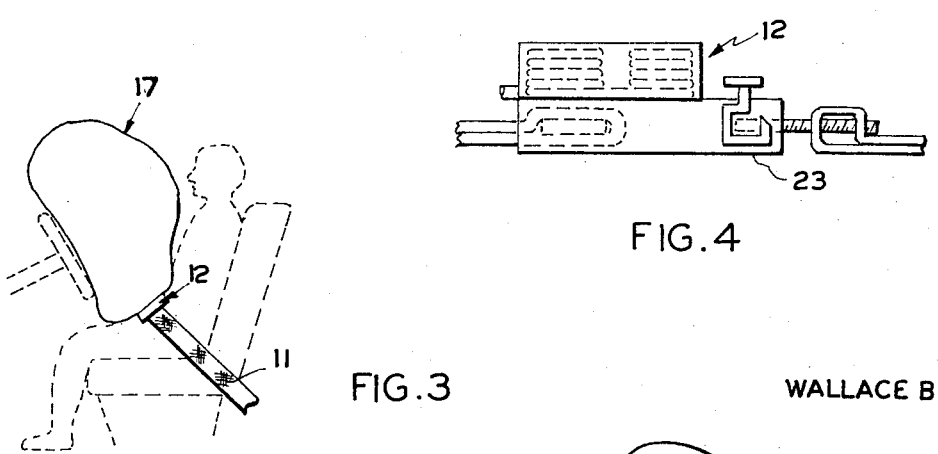
FIG. 3 is a schematic showing of the inflated bag and illustrating the device in use to protect the driver of the vehicle.
FIG. 4 is a side view of a modified form of the device.

As shown in FIG. 4 the container 12 may be incorporated in or made an integral part of the buckle 23 of the seat belt. The seat belt buckle is commonly positioned centrally in front of the occupant when the belt is fastened. However, small or large occupants will find that this central positioning may require that the belt anchoring means be designed so that the buckle position can be changed as needed.

OPERATION

The operation of the device is probably clear from the described structure, but in the interest of complete disclosure it will be described. Refer to FIG. 3. The portion of the passenger compartment occupied by the driver is shown. The driver's seat belt is fastened and container 12 has been adjusted longitudinally along belt 11 to the desired position centrally in front of the driver. In the event of an accident, an impact severe enough to actuate the trigger means will be produced and cause immediate inflation of the bag. The panel 21 is forced from its retained position by the initial pressure build-up and the bag expands to form a gas cushion between the driver and the steering wheel, instrument panel and windshield. This cushion will soften the impact between car and driver, thus preventing injury to the driver or reducing the severity of his injuries.

The bag need not be completely encased, though such encasement is preferred to protect the bag from wear and accidental damage. The bag may, however, be held in collapsed condition by a tie or ties which are released when the bag is inflated. The bag may be encased in a repturable container for storage. A variety of ways to store the inflatable bag on the center of the belt will suggest themselves to those skilled in the art. The basic characteristic of importance in my invention is that the bag is stored on the occupant's seat belt and is positioned centrally in front of him.

The bag may be made of a fabric that is strong, stable, light and compressible for storage in a small space. The weave will determine the degree of porosity of the bag.

This pre-calculated porosity is vital in the function of the whole system. The bag must be rapidly inflated and then deflated at a rate that will absorb the forward motion of the occupant caused by momentum. This controlled deflation also prevents any rebound or "bounce" tendency on the part of the occupant. The bag can be formed, shaped and sized by appropriate tailoring of the material.

I claim:

1. In combination
   a. a seat belt for a vehicle;
   b. an inflatable bag of burst resistant, flexible sheet material;
   c. means operable to inflate the bag with gas under pressure;
   d. a container to which the base of the bag is secured and releasably confining said bag in collapsed condition prior to its inflation and permitting automatic release of said bag during its inflation, said container being adjustably secured to the belt between its ends;
e. an opening in an exposed portion of the container walls and through which the expanding bag is passed during its inflation;
f. a panel impositively confined in said opening and expelled therefrom during inflation of the bag; and
g. buckle means in said seat belt, the container being an integral part of the buckle.

2. In combination
a. a seat belt for a vehicle;
b. an inflatable bag of burst-resistant, flexible sheet material;
c. means operable to inflate the bag with gas under pressure;
d. means to which the base of the bag is secured and releasably confining said bag in its collapsed condition prior to its inflation, said confining means including a container in which the bag is mounted, said container being adjustably secured to the belt between its ends and having
   A. an opening in an exposed portion of the container wall;
   B. a panel impositivily confined in said opening and expelled therefrom during inflation of the bag;
   C. said panel comprising a stiffened portion of the bag.

* * * * *